United States Patent [19]
Nagai et al.

[11] Patent Number: 5,912,090
[45] Date of Patent: Jun. 15, 1999

[54] NICKEL-HYDROGEN STACKED BATTERY PACK

[75] Inventors: Ryo Nagai, Hirakata; Hiroshi Fukunaga, Settsu; Masahiko Takai, Kobe, all of Japan

[73] Assignee: Hitachi Maxell, Ltd., Osaka, Japan

[21] Appl. No.: 08/812,504

[22] Filed: Mar. 7, 1997

[30] Foreign Application Priority Data

Mar. 8, 1996 [JP] Japan ................................. 8-081042

[51] Int. Cl.$^6$ ................................................. H01M 10/30
[52] U.S. Cl. ........................... 429/59; 429/131; 429/137; 429/139; 429/223
[58] Field of Search .................. 29/623.4, 623.5; 429/59, 223, 139, 137, 141, 131

[56] References Cited

U.S. PATENT DOCUMENTS

| | | | |
|---|---|---|---|
| 3,625,772 | 12/1971 | Himy | 429/139 |
| 5,409,867 | 4/1995 | Kozawa et al. | 29/623.2 |
| 5,432,017 | 7/1995 | Hassemer et al. | 429/4 |
| 5,508,131 | 4/1996 | Bowen et al. | 429/210 |
| 5,510,203 | 4/1996 | Hamada et al. | 429/163 |
| 5,558,950 | 9/1996 | Ovshinsky et al. | 429/101 |

OTHER PUBLICATIONS

"Testing Methods for Water Resistance of Textiles", Japanese Industrial Standards L 1092–1992 (no month available).

"Testing Method for Air Permeability of Paper and Paperboard", Japanese Industrial Standard P 8117–1980 (no month available).

*Primary Examiner*—Maria Nuzzolillo
*Assistant Examiner*—Carol Chaney

[57] ABSTRACT

A nickel-hydrogen stacked battery pack containing at least two element cells each having a positive electrode, a negative electrode, a separator inserted between the positive and negative electrodes and an electrolytic solution, in which the element cells are stacked and contained in a hexahedral case, and an opening of said case is sealed with a sealing plate having a reversible vent, which battery pack has a high capacity.

7 Claims, 9 Drawing Sheets

NICKEL-HYDROGEN STACKED BATTERY PACK

BACKGROUND OF THE INVENTION

1. Field of the Invention

The present invention relates to a nickel-hydrogen stacked battery pack. In particular, the present invention relates to a nickel-hydrogen stacked battery pack which has a high capacity and can be produced at low costs.

2. Description of the Related Art

The voltage of a single nickel-hydrogen cell reaches only 1.2 V at which water is stabilized in the case of a metal hydride secondary cell. Therefore, a plurality of cells are connected in series and used in a high voltage state practically, and are often supplied in the form of a battery pack.

A conventional nickel-hydrogen battery pack comprises a plurality of cylindrical cells connected in series. For example, as shown in FIGS. 1A and 1B, three cylindrical cells 30 are connected in series to generate a nominal voltage of 3.6 V. In this case, the cylindrical cells as element cells can be mass produced at low costs, but the battery pack consisting of the cylindrical cells has many dead spaces between the cylindrical cells 30 as seen from FIG. 1A. Therefore, it is difficult to increase the capacity per unit volume of such the battery pack.

To remove such the drawback of the battery pack consisting of cylindrical cells, it is proposed to produce hexahedral element cells having a rectangular cross section and connect a plurality of hexahedral element cells in series. For example, as shown in FIGS. 2A and 2B, three hexahedral cells 40 are connected in series to generate a nominal voltage of 3.6 V.

The battery pack consisting of the hexahedral cells has no dead space, since each element cell has flat peripheral surfaces as shown in FIG. 2A.

The hexahedral element cells have a structure that the opening of a hexahedral case containing power-generating elements such as positive and negative electrode, separators and an electrolytic solution is sealed with a sealing plate having a reversible vent. Therefore, the volume of each element cell becomes large in relation to the filled volume of the power-generating elements, and thus the increase of capacity is limited. Furthermore, the hexahedral case and the sealing plate having the reversible vent must be supplied for assembling each element cell since the opening of each cell case is completely sealed with the sealing plate. In addition, the sealing of the opening requires some costs, and therefore the production costs increase.

SUMMARY OF THE INVENTION

An object of the present invention is to provide a nickel-hydrogen stacked battery pack which has a high capacity and can be produced at low costs.

According to the first aspect, the present invention provides a nickel-hydrogen stacked battery pack comprising a cell stack containing at least two element cells each having a positive electrode which comprises nickel hydroxide, a negative electrode which comprises a hydrogen occlusion alloy, a separator made of a polymer non-woven fabric inserted between said positive and negative electrodes and an electrolytic solution which comprises an aqueous alkali solution, wherein said element cells are stacked and contained in a hexahedral case, and an opening of said case is sealed with a sealing plate having a reversible vent.

According to the second aspect, the present invention provides a nickel-hydrogen stacked battery pack comprising at least two cell stacks each consisting of at least two element cells according to the present invention, wherein said cell stacks are connected in parallel or in series and contained in a hexahedral case, and an opening of case is sealed with a sealing plate having a reversible vent.

In a preferred embodiment, the periphery of the element cell or cell stack is sealed with a hot melt adhesive and/or a heat-shrinkable sheet or tube.

In another preferred embodiment, at least a part of the periphery of the element cell or cell stack is covered with a film having a selective vapor/liquid permeability.

DETAILED DESCRIPTION OF THE INVENTION

Figure 1A:
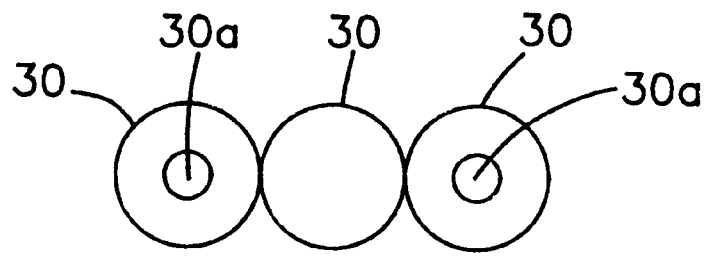
FIGS. 1A and 1B are a plan view and a front view, respectively of an example of a conventional battery pack consisting of three cylindrical cells connected in series.

The nickel-hydrogen stacked battery pack of the present invention comprises at least two element cells, and each cell has a positive electrode which comprises, nickel hydroxide, a negative electrode which comprises a hydrogen occlusion alloy, a separator made of a polymer non-woven fabric inserted between said positive and negative electrodes and an electrolytic solution which comprises an aqueous alkali solution.

In the present invention, the electrodes, separators and electrolytic solutions may be conventional ones, and each element cell can be assembled from these elements by any conventional method.

Preferably, the electrodes are formed as follows:

A hydrogen occlusion alloy powder as a negative active material is mixed with a binder resin (e.g. a polyvinylidene fluoride, polyvinyl alcohol, carboxymethylcellulose, styrene-butadiene rubber, etc.) and a solvent (e.g. N-methyl-2-pyrrolidone, water, alcohols, hexane, etc.), and a slurry containing the hydrogen occlusion alloy powder is obtained.

The kind of the hydrogen occulusion alloy is not limited. Preferred examples of the hydrogen occulusion alloy are Mm (Misch metal comprising La, Ce, Nd and Pr)—Ni alloys, Ti—Ni alloys, Ti—Ni—zr alloys (for example, $(Ti_{2-x}Zr_xV_{4-y}Ni_y)_{1-z}Cr_z$ in which x is a number of 0 to 1.5, y is a number of 0.6–3.5 and z is a number of 0 to 0.2), Ti—Mn alloys, Zr—Mn alloys, and the like. Among them, Mm—Ni alloys are preferred. The hydrogen occulusion alloy preferably has an average particle size of 100 $\mu$m or less.

The slurry is applied on a surface of a metal plate which functions as a collector (e.g. nickel plate, iron plate, nickel-plated iron plate, etc.) and dried, and a negative electrode is formed on the metal plate.

Separately, nickel hydroxide powder as a positive electrode active material, metal nickel powder and optionally cobalt powder are mixed with a binder resin (e.g. cellulose resin, polytetrafluoroethylene, polyvinyl alcohol, styrene-butadiene rubber, polyvinylidene fluoride, etc.) dissolved or dispersed in a solvent (e.g. water, alcohols, N-methyl-2-pyrrolidone, etc.), and a slurry containing nickel hydroxide is obtained.

This slurry is applied on the other surface of the above metal plate and dried, and a positive electrode is formed on the metal plate.

Alternatively, the positive or negative electrodes may be formed on both sides of a metal plate, or the positive or negative electrode may be independently formed on one side of the respective metal sheets.

Then, the element cells are stacked with inserting a separator between a pair of adjacent cells, and impregnated with an electrolytic solution.

The electrolytic solution is usually an aqueous solution of an alkali such as hydroxides of alkali metals (e.g. potassium, sodium, lithium, etc.). The concentration of the alkali in the solution is usually between 25 and 40 wt. %.

The cell stack is placed in a hexahedral case, and an opening of the case is sealed with a sealing plate having a reversible vent.

The hexahedral case is usually made of a metal such as stainless steel, nickel-plated iron plate, etc.

The sealing plate is made of a metal such as stainless steel, nickel-plated iron plate, etc.

The reversible vent is disclosed in, for example, U.S. Pat. Nos. 3,994,749 and 4,298,662, the disclosures of which are hereby incorporated by reference. An example of the reversible vent will be explained in the Examples.

In an embodiment, at least two cell stacks, preferably 2 to 6 cell stacks, each consisting of at least two element cells are connected in parallel or in series and contained in the hexahedral case, and an opening of case is sealed with a sealing plate having a reversible vent.

In a preferred embodiment, the periphery of the element cell or cell stack is sealed with a hot melt adhesive and/or a heat-shrinkable sheet or tube.

The hot meld adhesive and heat-shrinkable sheet or tube may be conventional ones. Examples of the hot melt adhesive are one comprising maleic anhydride-modified polyolefin, polyethylene, ethylene copolymers, polyamide, polyester etc. Preferably, the heat-shrinkable sheet or tube is made of polyvinylidene fluoride, polyolefin, polyvinyl chloride, etc.

In another preferred embodiment, at least a part of the periphery of the element cell or cell stack is covered with a film having selective vapor/liquid permeability.

Such the film preferably has a gas permeability of between 0.2 and 7 $cc/cm^2.sec$., more preferably between 1 and 5 $cc/cm^2.sec$. when measured according to JIS P 8117, and a water resistance of between 0.02 and 2 $kg/cm^2$, more preferably between 0.2 and 1.0 $kg/cm^2$ when measured according to JIS L 1092A.

Examples of such the film are microporous polymer films such as expanded polytetrafluoroethylene film, etc.

The gasses generated in the battery pack of the present invention such as hydrogen gas generated until the achievement of equilibrium with the hydrogen occlusion alloy and oxygen gas generated on the positive electrode escape from the element cells since each element cell is not sealed unlike the conventional hexahedral element cells. The hydrogen and oxygen gasses have no adverse influence on other element cells when they migrate in other element cells, since they have no electrical conductivity. In addition, these gasses are gradually absorbed by the element cells and therefore do not leak outside the case of the battery pack since the cell stack of the element cells is contained in the hexahedral case and the case is sealed.

The battery pack of the present invention is as safe as the conventional cells having the reversible vent, since the case of the battery pack has the reversible vent which can release the abnormal pressure generated by abnormal use of the battery.

The use of a single reversible vent for the hexahedral case of the battery pack can reduce the number of reversible vents, increases the capacity of the battery pack as a whole and reduces the production costs.

Furthermore, the sealing of the peripheries of the element cells with the hot melt adhesive and/or heat shrinkable sheet or tube improves the shape stability of the cells during the production of the cell stack and prevents accidental short circuit due to the thin thickness of the elemental cell.

The sealing of the periphery of the cell stack with the hot melt adhesive and/or heat shrinkable sheet or tube electrically insulates the periphery of the cell stack and prevents the short circuit caused by the contact between the elemental cells and the inner wall of the case.

The use of the film having selective vapor/liquid permeability for sealing at least a part of the periphery of the element cell preferably prevents the shirt circuit formation due to the liquid junction between the cells caused by the exudation of the electrolytic solution.

When the film having selective vapor/liquid permeability is provided, the hydrogen gas generated on the negative electrode during charging and the oxygen gas generated on the positive electrode in the case of overcharge migrate between the cells through the film having selective vapor/liquid permeability and are absorbed by the negative electrodes of other cells. Therefore, the increase of internal pressure in the battery pack is suppressed and thus the cycling characteristics of the battery pack is improved. In addition, the film having selective vapor/liquid permeability confines the electrolytic solution in the cell and prevents the liquid junction between the cells.

The present invention will be illustrated by the following Examples, which do not limit the scope of the present invention in any way.

EXAMPLE 1

Each element cell was produced as follows:

A 12 wt. % solution of polyvinylidene fluoride in N-methyl-2-pyrrolidone (28 wt. parts) was added to an AB 5 type hydrogen occlusion alloy (Composition: $MmNi_{3.55}Co_{0.75}Mn_{0.4}Al_{0.3}Mo_{0.04}$ wherein Mm is a Misch metal having a composition of $La_{0.32}Ce_{0.48}Nd_{0.15}Pr_{0.04}$) (100 wt. parts) and uniformly stirred, and a slurry containing the hydrogen occlusion alloy as an active material was prepared.

The slurry was coated on a nickel plate having a thickness of 20 $\mu$m which also functions as a collector by a squeegee coating method and heated to evaporate N-methyl-2-pyrrolidone, followed by pressing, and a negative electrode comprising the hydrogen occlusion alloy and having a thickness of 150 $\mu$m was formed.

Figure 3:
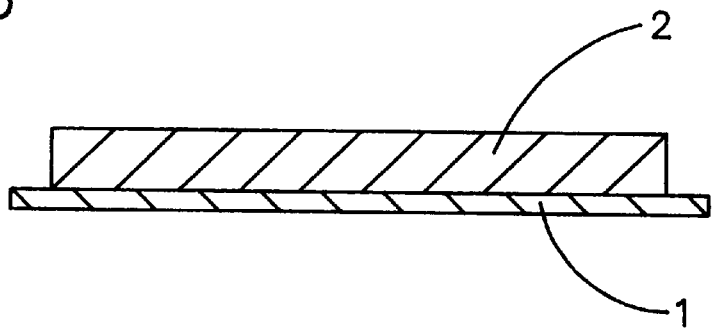
FIG. 3 schematically shows a cross section of a negative electrode formed on a nickel plate.

FIG. 3 schematically shows a cross section of the above negative electrode 2 formed on the nickel plate 1.

Nickel hydroxide powder (100 wt. parts), metal nickel powder (5 wt. parts) and metal cobalt powder (8 wt. parts) were mixed. To this mixture, a 2 wt. % aqueous solution of carboxymethylcellulose (52 wt. parts) and a 60 wt. % aqueous, dispersion of polytetrafluoroethylene (6 wt. parts) were added and thoroughly stirred, and a slurry containing nickel hydroxide as an active material was prepared. Nickel hydroxide is present when the cell is in the discharged state.

This slurry was coated on another nickel plate having a thickness of 20 $\mu$m by the squeegee coating method, dried and pressed, and a positive electrode comprising nickel hydroxide and having a thickness of 250 $\mu$m was formed.

Figure 4:
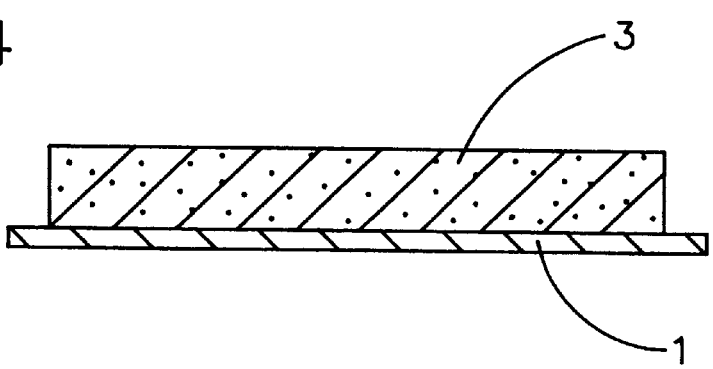
FIG. 4 schematically shows a cross section of a positive electrode formed on a nickel plate.

FIG. 4 schematically shows a cross section of the positive electrode 3 formed on the nickel plate 1.

Figure 5:
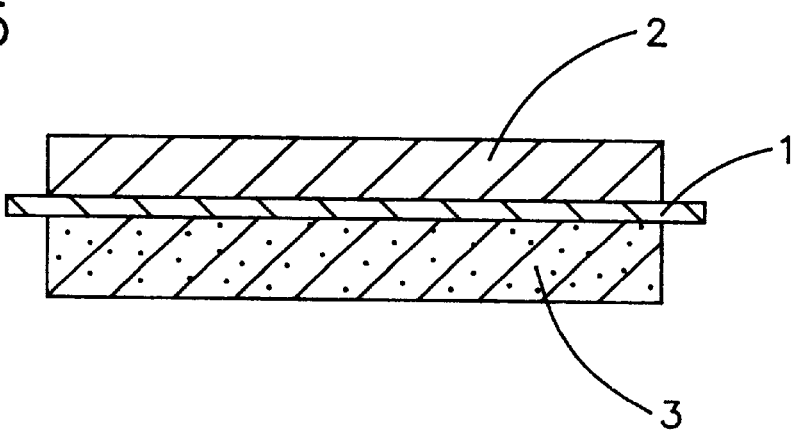
FIG. 5 schematically shows a cross section of negative and positive electrodes formed on a single nickel plate.

Separately, a negative electrode 2 and a positive electrode 3 were formed on respective surfaces of a single nickel plate 1, and an electrode member as shown in FIG. 5 was obtained. The materials and thicknesses of the both electrodes were the same as above.

Figure 6:
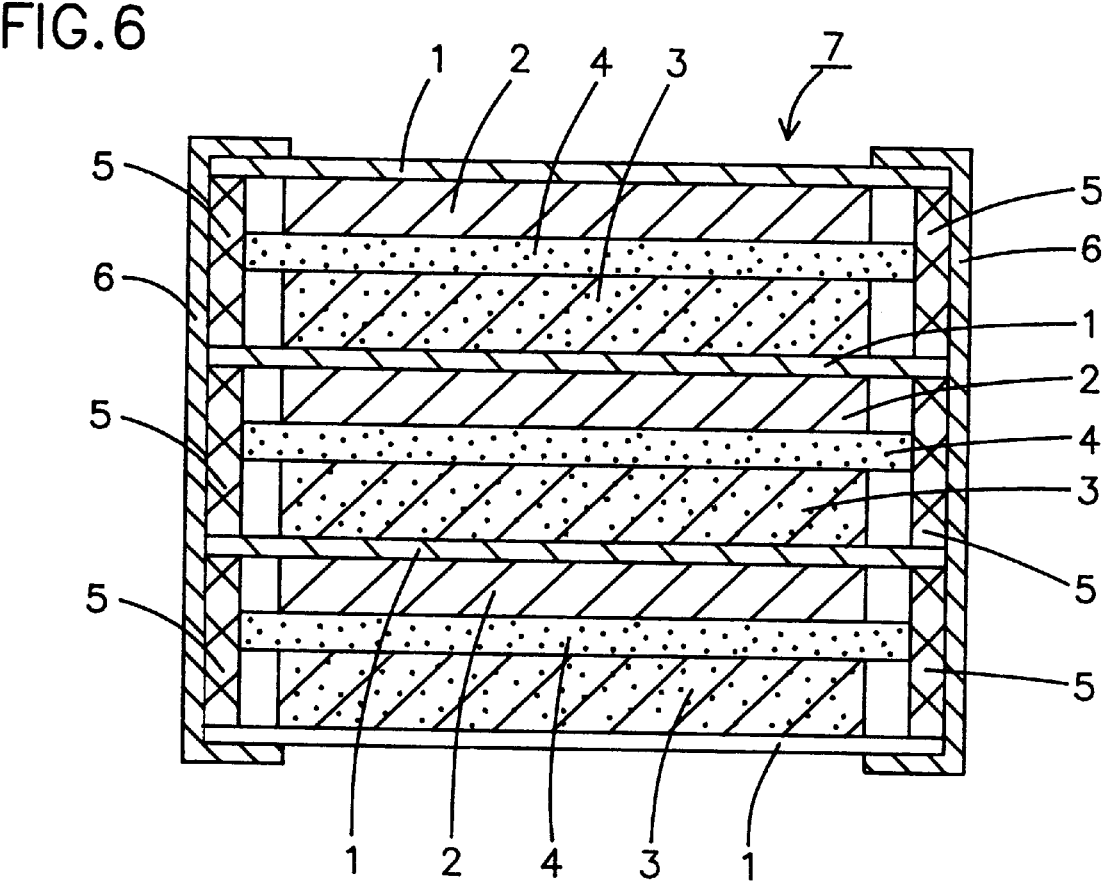
FIG. 6 schematically shows a cross section of an example of a nickel-hydrogen stacked battery pack according to the present invention.

The positive and negative electrodes and the electrode member were cut to a size of 30 mm×30 mm, and laminated with inserting a separator 4 made of a polypropylene non-woven fabric which had been made hydrophilic and had a thickness of 130 $\mu$m between the adjacent negative and positive electrodes as shown in FIG. 6. Then, three element cells were stacked and connected in series for assembling a cell stack 7 having three units each of which consisted of the negative electrode 2, the separator 4 and the positive electrode 3.

Next, the cell stack was impregnated with an electrolytic solution which had been prepared by dissolving 17 g of lithium hydroxide per one liter of a 30 wt. % aqueous solution of potassium hydroxide. The impregnated amount of the electrolytic solution was 0.3 ml per each element cell.

After that, the exposed peripheries of the cells were sealed with a hot melt adhesive 5, and then the outer periphery of the cell stack was sealed with a heat shrinkable tube 6. The hot melt adhesive contained maleic anhydride-modified polyolefin as a main ingredient, and the heat shrinkable tube was made of an expanded polyvinylidene fluoride film.

Figure 7A:
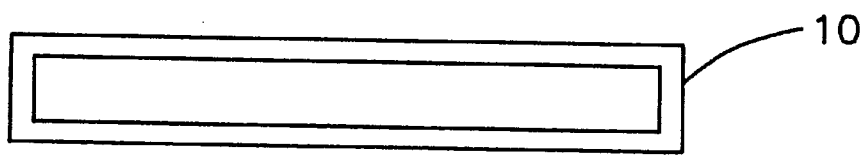
FIGS. 7A and 7B are a plan view and a cross section of a box-shape case for containing cell stacks.
Figure 7B:
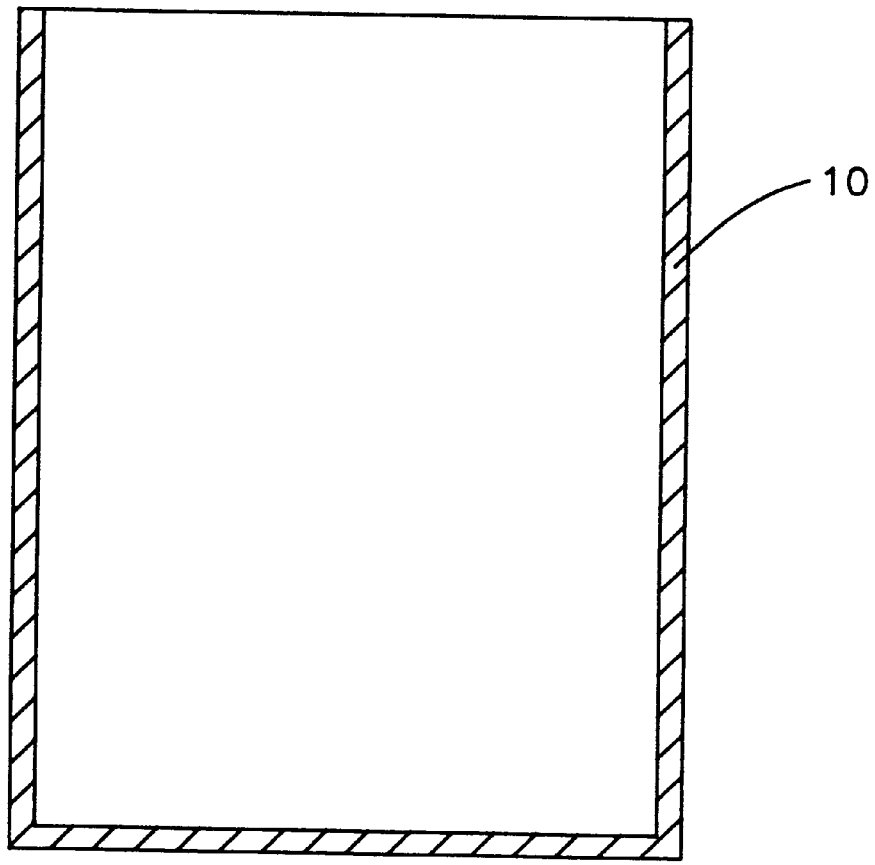

Five cell stacks were connected in parallel and contained in a box-shape case 10 made of stainless steel and having a structure, a plan view and cross section of which are shown in FIGS. 7A and 7B, respectively.

Figure 8:
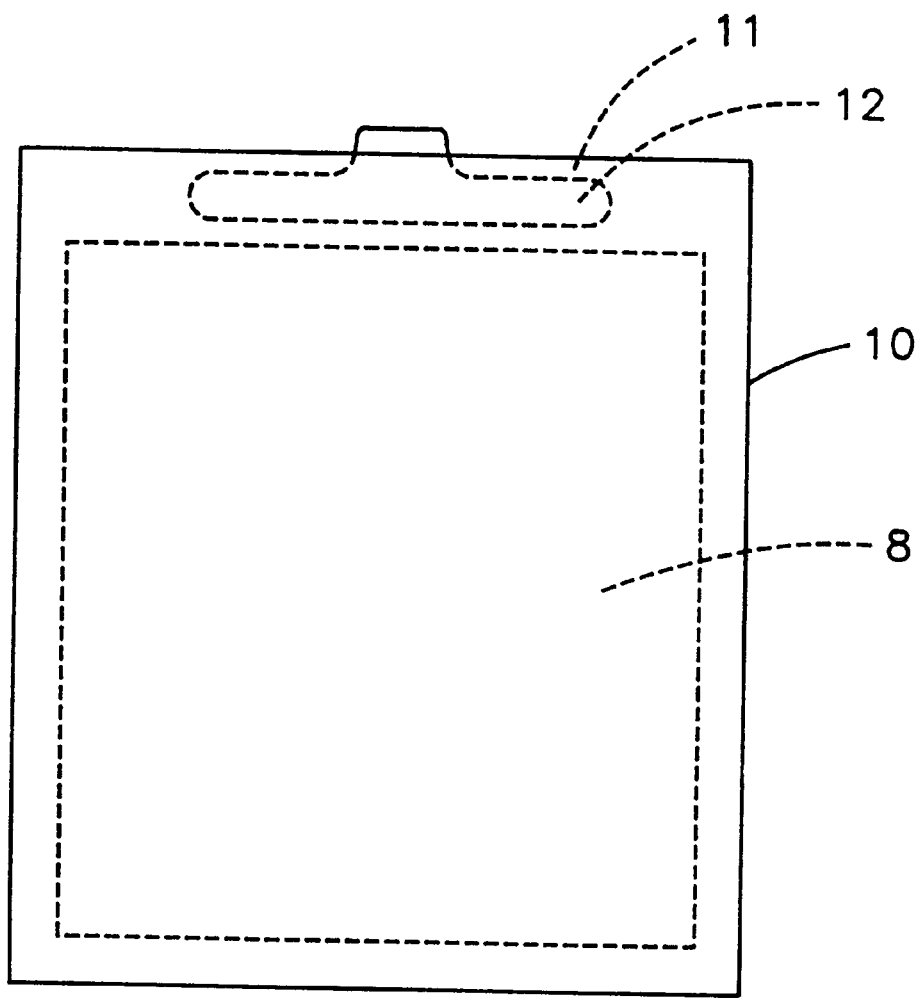
FIG. 8 schematically shows a front view of an example of the nickel-hydrogen stacked battery pack.

The upper opening of the case 10 was capped with a sealing plate 11 having a reversible vent 12 which functions at a pressure of 10 atm. or less. Then, the edge of the sealing plate 11 and the opening edge of the case 10 were welded with a laser beam, and a nickel-hydrogen battery pack shown in FIG. 8 was obtained. In FIG. 8, the numeral 8 stands for the five cell stacks connected in parallel.

The reversible vent 12 exhausts the gasses from the internal space of the battery pack through the function of a valve when the gasses are generated abnormally in the internal space because of the abnormal use of the batter pack and the internal pressure abnormally increases. After the internal pressure returns to the normal pressure, the valve returns to the original state and seals the internal space of the battery pack.

This Example used the reversible vent comprising a rubber valve which is pressed against the vent hold, although other types of reversible vents may be used.

Figure 9:
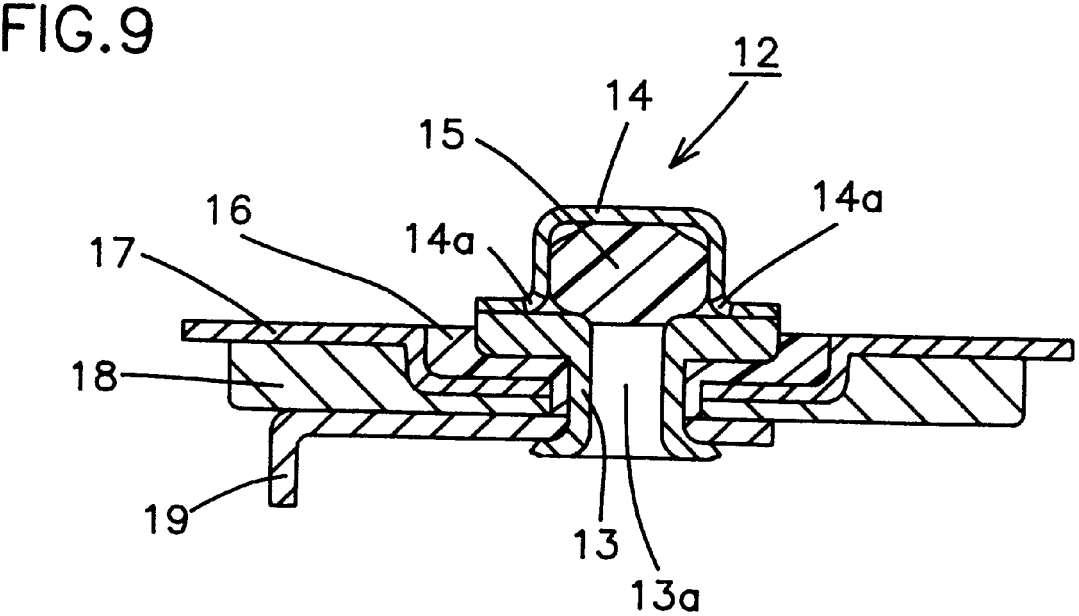
FIG. 9 schematically shows a cross section of a reversible vent used in the Examples.

FIG. 9 shows a cross section of the reversible vent used in this Example more in detail. The structure of the reversible vent will be explained by way of example with referring to FIG. 9.

The reversible vent 12 has a base member 13 made of a hollow rivet. The periphery of a cap-form positive electrode terminal 14 is spot welded onto an upper flat edge of the base member 13, and has a rubber valve 15 inserted in the hollow space of the terminal 14. The valve 15 closes a vent hole 13a at the center of the base member 13 and maintains the sealed state of the internal space of the battery pack under normal conditions.

An insulating annular gasket 16 is provided below the upper flat edge of the base member 13 and around the cylindrical part of the member 13. A lid portion 17 of the sealing plate 11 reaches below the gasket 16, and an insulating annular spacer 18 is provided below the lid portion 17. A lower part of the base member 13 is spot welded to a tip portion of a positive electrode collector tab 19 which is electrically connected with the cell stacks 8 (not shown in FIG. 9).

The tab 19 and the lid 17 are insulated with the insulating spacer 18, and the lid 17 and the base member 13 are insulated with the insulating gasket 16. The positive electrode terminal 14 is electrically contacted with the tap 19 through the base member 13.

If an internal pressure in the battery pack increases abnormally, the valve 15 is deformed by the pressure, and does not close the vent hole 13 any more. As the result, the gasses in the battery pack passes through the vent hole 13 and then a vent hole 14a provided in the positive electrode terminal 14 and escapes outside the battery pack. Accordingly, the internal pressure decreases. When the internal pressure returns to the normal pressure, the valve 15 recovers the original shape and again closes the vent hole 13a. Thus, the interior of the battery pack is maintained in the sealed state.

A sealant is applied on contacting surfaces between the base member 13 and the insulating gasket 16 and between the insulating gasket 16 and the lid 17 for increasing the sealing properties between them.

The above assembled battery pack had an external size of 34 mm×48 mm×10.5 mm, a nominal voltage of 3.6 V, and a theoretical capacity of 1000 mAh. The discharging capacity was 1010 mAh after charging the battery pack at 20° C., 1A for 1.2 hours and discharging at 100 mA to 3.0 V, and a discharging capacity per unit volume was 59 mAh/cc.

EXAMPLE 2

A cell stack was assembled from the same electrodes, separators and electrolytic solution as those used in Example 1.

Figure 10:
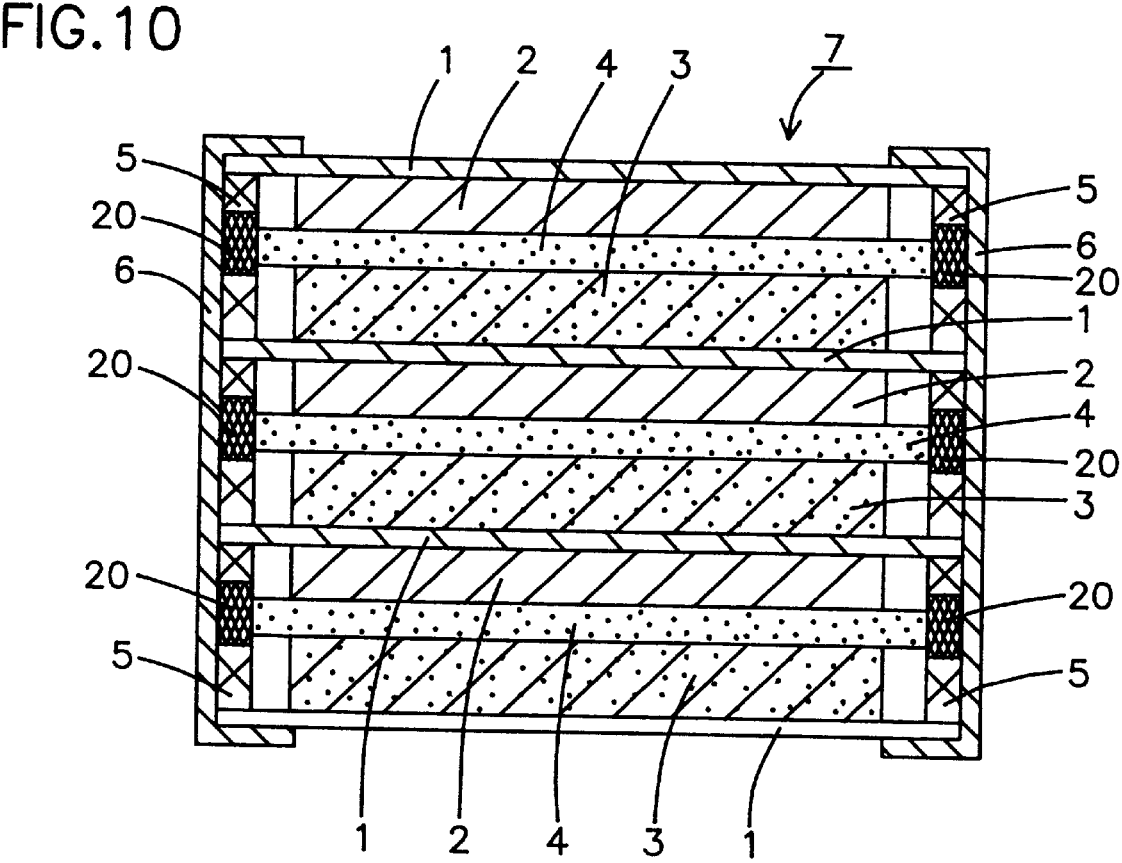
FIG. 10 schematically shows a cross section of another example of a nickel-hydrogen stacked battery pack according to the present invention.

The center part of the periphery of each element cell was wrapped with a film having a selective vapor/liquid permeability 20, while upper and lower parts of the periphery of each element cell were sealed with a hot melt adhesive 5 as shown in FIG. 10. Furthermore, the cell stack having the films 10 and the hot melt adhesive 5 was sealed with a heat shrinkable tube 6.

The film having a selective vapor/liquid permeability was made of a porous polytetrafluoroethylene film (Trade name: MICROTEX NTF 1026-NO1 available from NITTO DENKO Co., Ltd.) having a thickness of 170 $\mu$m, a gas permeability of 0.2 cc/cm$^2$.sec. (measured according to JIS P 8117), and a water resistance of 2 kg/cm$^2$ (measured according to JIS L 1092A). The materials of the hot melt adhesive and heat shrinkable tube were the same as those used in Example 1. The cross section of the assembled battery pack of this Example is shown in FIG. 10.

The battery pack of this Example had the same external size as that of Example 1, a nominal voltage of 3.6 V, and a theoretical capacity of 1000 mAh. The discharging capacity was 1010 mAh after charging the battery pack at 20° C., 1A for 1.2 hours and discharging at 100 mA to 3.0 V, and a discharging capacity per unit volume was 59 mAh/cc.

Comparative Example 1

Figure 1B:
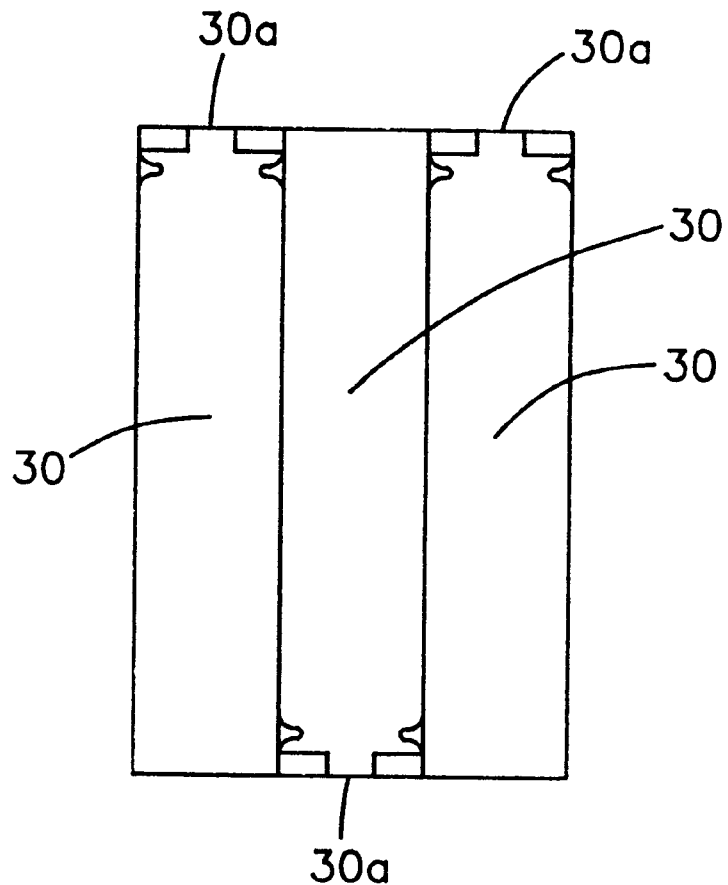

Three cylindrical U-4 cells each having an outer diameter of 10.5 mm and a height of 44.5 mm were connected in series and assembled as shown in FIG. 1. The obtained battery pack had an external size of 31.5 mm×44.5 mm×10.5 mm, a nominal voltage of 3.6 V. The discharging capacity was 480 mAh after charging the battery pack at 20° C., 1A for 1.2 hours and discharging at 100 mA to 3.0 V, and a discharging capacity per unit volume was 33 mAh/cc.

The reason why the discharging capacity of the battery pack of this Comparative Example was low is that the battery pack had many dead spaces as shown in FIG. 1A because each cell 30 was cylindrical. In FIG. 1, the reference 30a stands for a positive electrode terminal.

Comparative Example 2

Figure 2A:
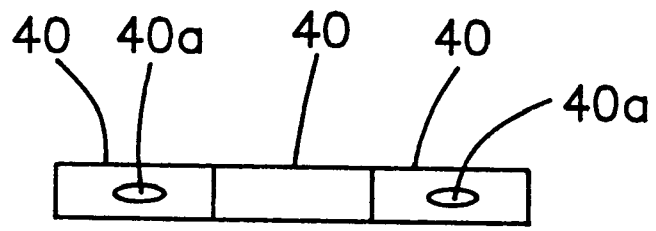
FIGS. 2A and 2B are a plan view and a front view, respectively of another example of a conventional battery pack consisting of three hexahedral cells connected in series.
Figure 2B:
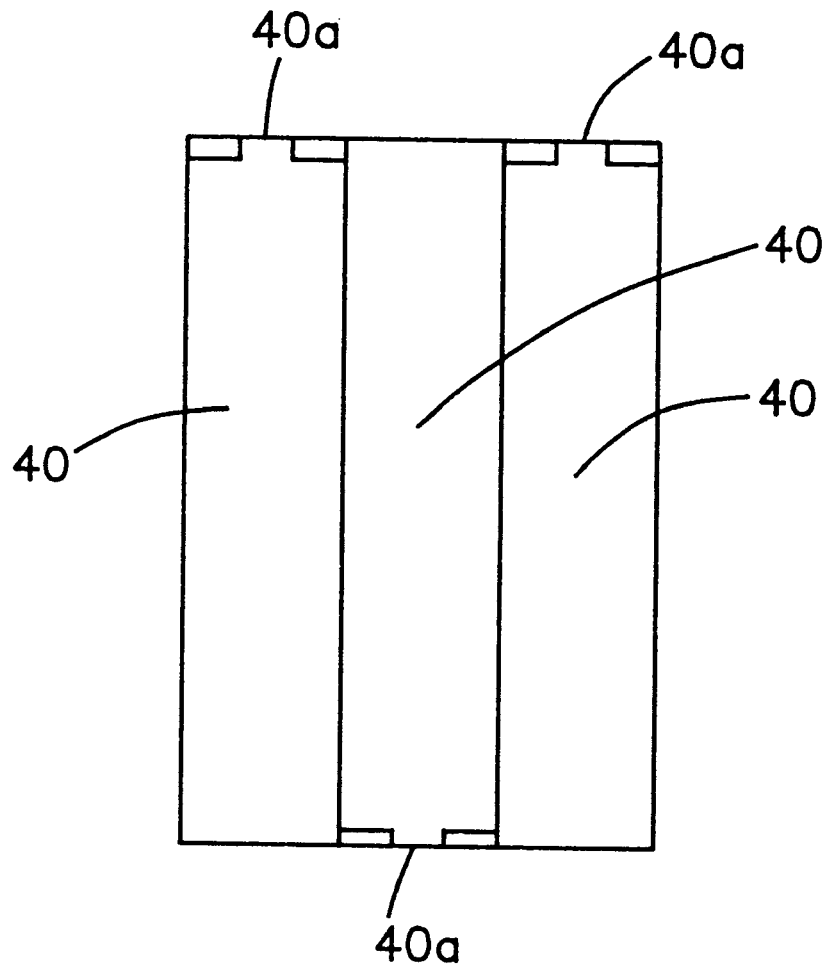

Three hexahedral (box-shape) cells each having an external sized of 17 mm×6.1 mm×48.0 mm (height) were connected in series and assembled as shown in FIG. 2, in which the reference 40a stands for the positive electrode terminal. The obtained battery pack had an external size of 51.0 mm×48 mm×6.1 mm, a nominal voltage of 3.6 V. The discharging capacity was 600 mAh after charging the battery pack at 20° C., 1A for 1.2 hours and discharging at 100 mA to 3.0 V, and a discharging capacity per unit volume was 40 mAh/cc.

The battery pack of this Comparative Example did not have dead spaces unlike that of Comparative Example 1. However, the discharging capacity was not so high as those of Examples 1 and 2. The reason for such low discharging capacity is that each hexahedral cell had the reversible vent and therefore the filled volume of the power-generating elements was not large in relation to the volume of the element cell.

Figure 11:
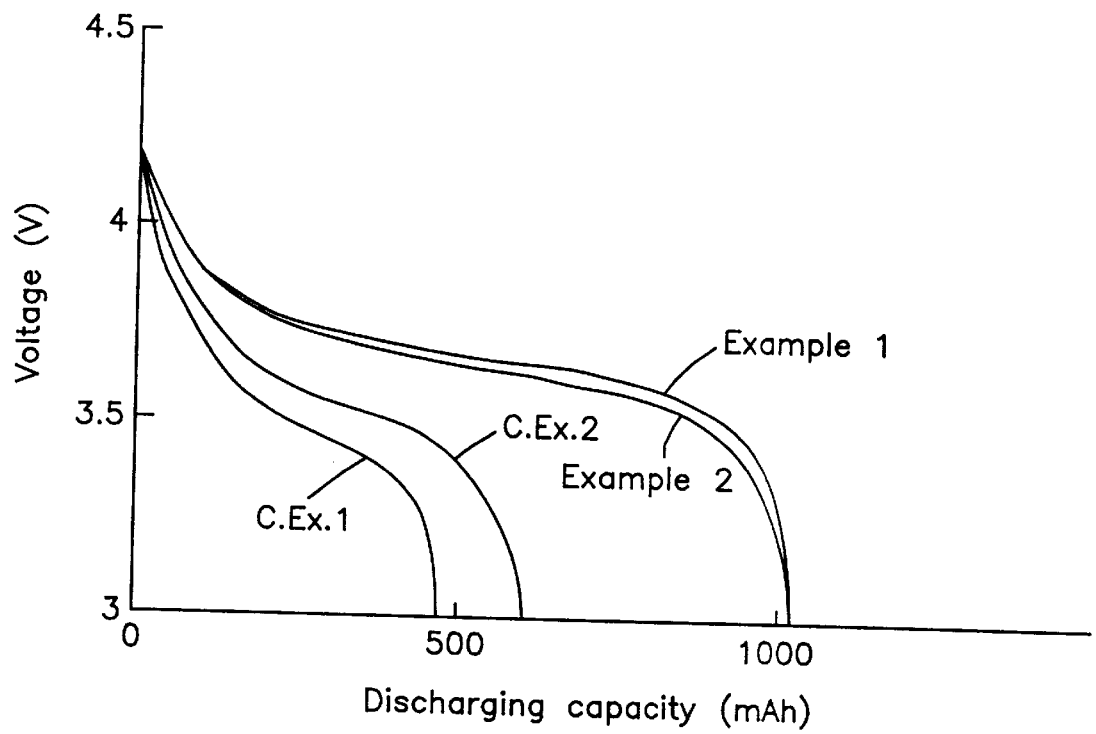
FIG. 11 is a graph showing the discharging curves obtained in Examples 1 and 2 and Comparative Examples 1 and 2.

Each of the battery packs obtained in Examples 1 and 2 and Comparative Examples 1 and 2 was discharged at an electric current of 100 mA. The discharging curves are shown in FIG. 11.

Figure 12:
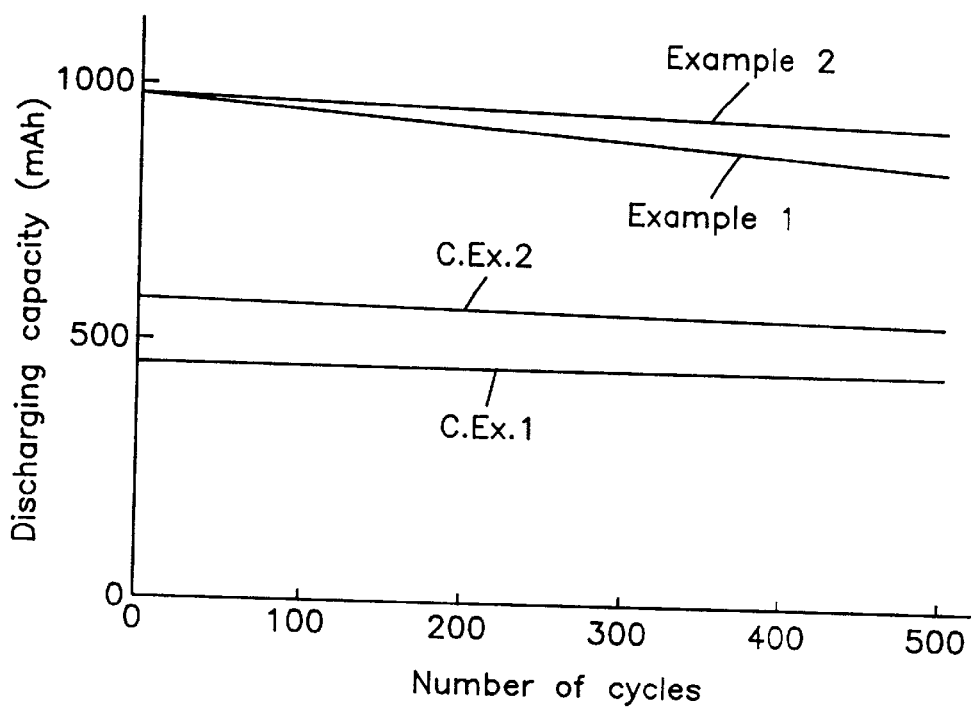
FIG. 12 is a graph showing the cycling characteristics of the batteries assembled in Examples 1 and 2 and Comparative Examples 1 and 2.

Each of the battery packs obtained in Examples 1 and 2 and Comparative Examples 1 and 2 was charged at 1C until the voltage drop reached 5 mV. Then, the battery pack was discharged at 1C to 3.0 V. These charging and discharging were repeated, and the cycling characteristics of the cell was evaluated. The results are shown in FIG. 12.

The battery packs of Examples 1 and 2 had the larger capacity and better cycling characteristics than those of Comparative Examples 1 and 2, although the battery packs had the same volume.

The battery pack of Example 2 had excellent cycling characteristics. This result indicates that the oxygen and hydrogen gasses moved outside the cell stacks through the film having a selective vapor/liquid permeability, and a reaction for converting oxygen and hydrogen gasses to water proceeded in other cells smoothly.

The safety of the battery packs of Examples 1 and 2 and the battery pack comprising the hexahedral cells of FIG. 2 were checked by the 1C overcharging and 1C overdischarging tests. The former battery packs were as safe as the latter battery pack.

In the above Examples, the electrode members having both the positive and negative electrodes on the respective surfaces of the nickel plate were used as the intermediately positioned electrodes. Instead, the positive or negative electrode formed on one surface of the nickel plate can be used.

What is claimed is:

1. A nickel-hydrogen stacked battery pack comprising a cell stack containing at least two element cells each having a positive electrode which comprises nickel hydroxide, a negative electrode which comprises a hydrogen occlusion alloy, a separator made of a polymer non-woven fabric inserted between said positive and negative electrodes and an electrolytic solution which comprises an aqueous alkali solution, wherein said element cells are stacked and contained in a hexahedral case, and an opening of said case is sealed with a sealing plate having a reversible vent, wherein the periphery of the element cells or the cell stack is sealed with a hot melt adhesive or a heat-shrinkable sheet or tube.

2. A nickel-hydrogen stacked battery pack comprising a cell stack containing at least two element cells each having a positive electrode which comprises nickel hydroxide, a negative electrode which comprises a hydrogen occlusion alloy, a separator made of a polymer non-woven fabric inserted between said positive and negative electrodes and an electrolytic solution which comprises an aqueous alkali solution, wherein said element cells are stacked and contained in a hexahedral case, and an opening of said case is sealed with a sealing plate having a reversible vent, wherein at least a part of the periphery of the element cell or cell stack is covered with a film having a vapor/liquid permeability.

3. A nickel-hydrogen stacked battery pack according to claim 2, wherein said film has a gas permeability of between 0.2 and 7 cc/cm$^2$.second when measured according to Japanese Industrial Standard P 8117, and a water resistance of between 0.02 and 2 kg/cm$^2$ when measured according to Japanese Industrial Standard L 1092A.

4. A nickel-hydrogen stacked battery pack comprising at least two cell stacks each consisting of at least two element cells as claimed in claim 1, wherein said cell stacks are connected in parallel or in series and contained in a hexahedral case, and an opening of case is sealed with a sealing plate having a reversible vent.

5. A nickel-hydrogen stacked battery pack according to claim 4, wherein the periphery of the element cell or cell stack is sealed with a hot melt adhesive or a heat-shrinkable sheet or tube.

6. A nickel-hydrogen stacked battery pack according to claim 4, wherein at least a part of the periphery of the element cell or cell stack is covered with a film having a vapor/liquid permeability.

7. A nickel-hydrogen stacked battery pack according to claim 6, wherein said film has a gas permeability of between 0.2 and 7 cc/cm$^2$.second when measured according to Japanese Industrial Standard P 8117, and a water resistance of between 0.02 and 2 kg/cm$^2$ when measured according to Japanese Industrial Standard L 1092A.

* * * * *